(12) United States Patent
Gachhadar et al.

(10) Patent No.: US 7,556,323 B1
(45) Date of Patent: Jul. 7, 2009

(54) LABYRINTH-SEAL ARRANGEMENT FOR A LANDFILL-COMPACTION VEHICLE

(75) Inventors: Suman Gachhadar, Plainfield, IL (US); Phillip S. Dinh, Plainfield, IL (US); Eric R. O'Brien, Yorkville, IL (US)

(73) Assignee: Caterpillar Inc., Peoria, IL (US)

( * ) Notice: Subject to any disclaimer, the term of this patent is extended or adjusted under 35 U.S.C. 154(b) by 84 days.

(21) Appl. No.: 11/779,397

(22) Filed: Jul. 18, 2007

(51) Int. Cl.
*B62D 55/088* (2006.01)
(52) U.S. Cl. .................................. 305/107; 305/100
(58) Field of Classification Search ................ 305/100, 305/107, 110, 115; 172/112, 610; 404/124, 404/129; 301/37.105; 280/855, 856; 188/218 A
See application file for complete search history.

(56) References Cited

U.S. PATENT DOCUMENTS

| | | | |
|---|---|---|---|
| 4,379,565 A | 4/1983 | Riddle | |
| 5,676,493 A | 10/1997 | Brockway | |
| 5,687,799 A * | 11/1997 | Greenfield et al. | 172/540 |
| 5,733,020 A | 3/1998 | McCartney et al. | |
| 5,951,123 A * | 9/1999 | Bomstad et al. | 305/107 |
| 5,967,242 A | 10/1999 | Caron et al. | |
| 6,045,295 A * | 4/2000 | Puchosic | 404/128 |
| 6,076,843 A * | 6/2000 | Sewell | 280/157 |
| 6,231,136 B1 * | 5/2001 | Freeman | 305/107 |
| 6,322,170 B1 * | 11/2001 | Knell et al. | 305/107 |
| 6,371,578 B1 * | 4/2002 | Ferguson | 305/107 |
| 2002/0114667 A1 * | 8/2002 | Kaldenberg et al. | 404/124 |
| 2007/0280783 A1 * | 12/2007 | Gibbins | 404/124 |

FOREIGN PATENT DOCUMENTS

DE 3445398 A1 * 6/1985

* cited by examiner

*Primary Examiner*—S. Joseph Morano
*Assistant Examiner*—Kip T Kotter
(74) *Attorney, Agent, or Firm*—Leydig, Voit & Mayer, Ltd (57) ABSTRACT

A labyrinth-guard arrangement for a joint between a compactor wheel and a machine that protects against intrusion of wire wrap into a central cavity of the wheel is disclosed. The labyrinth-guard is formed by a cooperation between a first flange connected to an inner cylindrical portion of the wheel, and a second flange connected to a guard plate. The first and second flanges, along with other surrounding components, cooperate to form the labyrinth-guard.

17 Claims, 5 Drawing Sheets

LABYRINTH-SEAL ARRANGEMENT FOR A LANDFILL-COMPACTION VEHICLE

TECHNICAL FIELD

This disclosure relates generally to compaction machines and, more particularly, to axle guard assemblies for compaction machines used to protect the axle and associated components from damage caused by refuse and debris.

BACKGROUND

Compaction machines are typically used in landfill operations and the like for moving and compacting waste and refuse material. Compactor wheels typically include an inner cavity formed by a hub, the hub being connected to a cylindrical outer surface on which numerous cleats may be mounted. Machine axles typically extend within the inner cavity for connection to the compactor wheels.

Because of the typically high costs associated with purchase and operation of such machines, it is desirable to operate such compactors efficiently and to minimize down-time for repairs. One condition that often arises and that requires cessation of operation of the equipment for service is an accumulation of debris onto and around axle joints within the inner cavity, between a wheel and one of the axles of the machine. Materials such as steel cable, wire, rope, and the like may present particular difficulties. This debris, commonly referred to as "wire-wrap," can migrate into the inner cavity of a compactor wheel and can damage and impede access to the axle seals, bearings, and/or other components that are commonly present in the inner cavity.

There have been attempts in the past to provide an effective guard or barrier arrangement against wire wrap intrusion, but such arrangements have only been partially successful. One such example of a barrier arrangement can be found in U.S. Pat. No. 5,967,242, entitled "Protecting Compactor Axles, Seals, And Wheel Bearings From Wire Wrap Intrusion," which issued on Oct. 19, 1999 (hereafter the '242 patent). In the '242 patent, a shroud that extends axially around a portion of an axle is equipped with a cover plate which, together with the shroud, serves to create a barrier to a wheel cavity enclosing the axle seals and bearings of a compactor machine. The shroud, as shown, extends past an outer edge of the wheel toward a centerline of the machine, and cooperates with a wire trap ring that is circumferentially placed inside the cavity. A serpentine path that is intended to impede the movement of landfill material to the cavity of the wheel is defined between the shroud, the trap ring, and an inner surface of the wheel. The design of the '242 patent has proven only partially effective in addressing the issue of landfill material intrusion. One disadvantage of the design of the '242 patent is that landfill material can enter the cavity of the wheel notwithstanding the radially upward and inward portions of the disclosed serpentine path.

BRIEF SUMMARY OF THE INVENTION

The present disclosure describes, in one aspect, a guard for a joint between a compactor wheel and a machine. A labyrinth-guard is created by cooperation of various components. A wheel-flange is configured to connect to an inner portion of the compactor wheel along a central cylindrical cavity of a wheel. The wheel-flange has a generally circular shape that conforms to the cavity, and a rectangular cross section. A guard-flange is configured to connect to an outer portion of a circular guard plate that is connected to an axle of the machine, adjacent to the joint. The guard-flange conforms peripherally to the circular guard plate and has a rectangular cross section. The wheel-flange and the guard-flange cooperate to form a labyrinth-guard when the wheel is connected to the machine and a gap exists between the wheel-flange and the guard flange.

A method of sealing an axle-joint between a wheel and an axle of a landfill compactor machine against intrusion of landfill material is disclosed. The method includes the step of connecting a first circumferential flange peripherally along an inner portion of the wheel surrounding a central cylindrical cavity. A second circumferential flange is provided peripherally along an outer edge of a wheel-facing side of a guard plate that is mounted to the axle and disposed adjacent to the axle-joint. Thus, a tortuous path is defined that acts as a labyrinth-guard to inhibit intrusion of wire wrap around the axle-joint.

DETAILED DESCRIPTION

This disclosure relates to a axle guard assembly that includes a labyrinth-guard arrangement for avoiding intrusion of wire wrap into and around components present at a joint between an axle of a compaction machine and a compaction wheel. The labyrinth-guard arrangement described herein is advantageously effective in protecting components found at an axle joint from wire wrap intrusion by creating a tortuous path that impedes the ingress of wire wrap into a cavity of the wheel that encloses such components.

Figure 1:
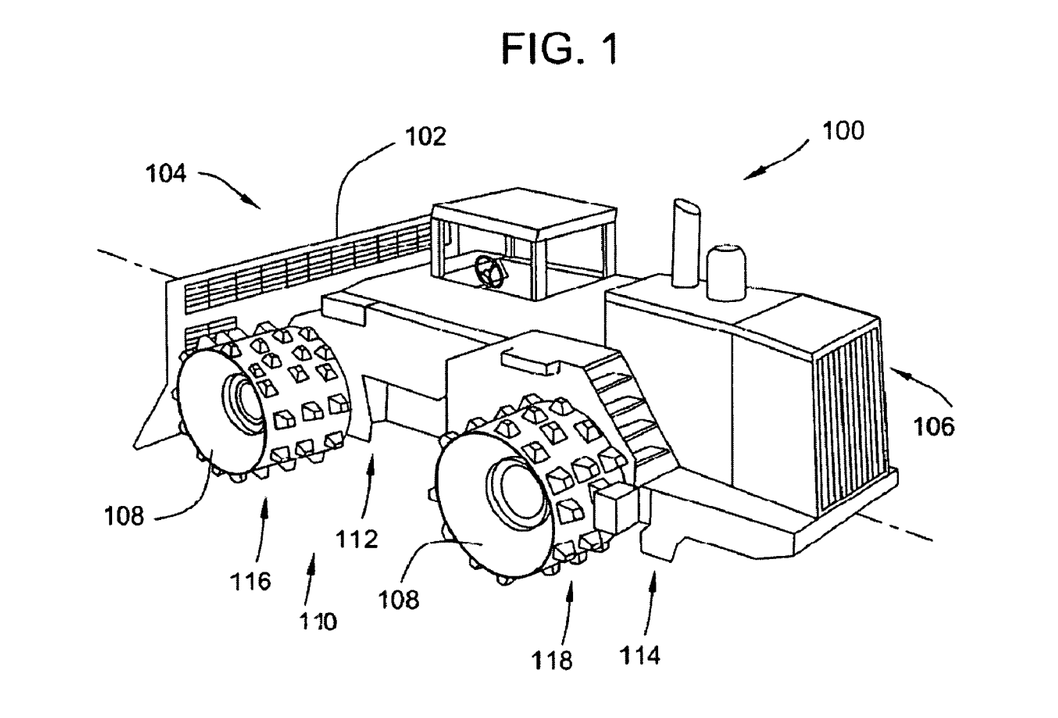
FIG. 1 is an outline view of a landfill compaction machine having wheel-to-axle interfaces in accordance with the disclosure.

The present disclosure provides an axle guard assembly for any mobile machine. An exemplary embodiment of such a machine 100, a landfill compactor, is illustrated in FIG. 1. It can be appreciated that the term "machine" may refer to any mobile machine that is employed in landfill or garbage dump operations, or any other similar industry known in the art. For example, machine 100 may be an earth moving machine such as a wheel loader, dump truck, motorgrader, compactor or the like.

An outline view of a landfill compactor machine 100 is shown in FIG. 1. The compactor machine 100 includes a blade 102 connected to a forward portion or non-engine end frame 104, an engine end frame 106, and four wheels 108. The engine end-frame 106 and the non-engine end-frame 104 are connected to each other at a hitch or articulation joint 105. A pair of steering cylinders 107 (one shown) may be mounted between frame members 104 and 106 on opposite sides of the machine 100 to provide steering. The engine end frame 106 may support, for example, a power source and cooling system components (not shown), the power source being operatively connected through a drive train (not shown) to drive the wheels for movement of the machine. Machine 100 may also include an operator station or cab 103.

Figure 2:
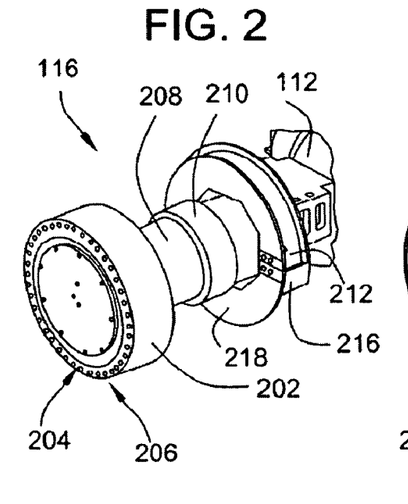
FIG. 2 is a partial outline view of a front axle for a landfill compaction machine.
Figure 3:
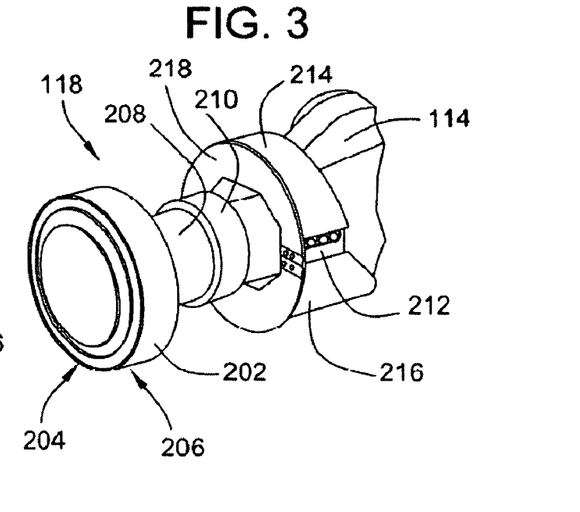
FIG. 3 is a partial outline view of a rear axle for a landfill compaction machine.

Only two of the four wheels 108 of the machine 100, those located on a left side 110 of the machine 100, are shown in FIG. 1. The machine 100 has two axles, a front axle 112 and a rear axle 114. The front axle 112 has a right end (not visible) and a left end 116. Similarly, the rear axle 114 has a left end 118 that is visible in the figure. A detailed outline view of the left end 116 of the front axle 112 is shown in FIG. 2, and a similar view of the left end 118 of the rear axle 114 is shown in FIG. 3. Other than their relative positions on the machine 100, the left ends 116 and 118 of the front and rear axles 112 and 114 are similar and will be described hereinafter using common reference numerals to denote similar respective elements.

Each end 116 and 118 has a hub portion 202 on a distal end thereof. The hub portion 202 has a plurality of fastener openings 204 disposed peripherally around an outer portion 206 of the hub portion 202. The hub portion 202 is connected to an extension portion 208, which is in turn connected to an axle-joint 210. The axle-joint 210 includes various internal components (not shown) that seal and allow the hub portion 202 and extension portion 208 to rotate relative to the rest of the machine 100. For instance, the axle-joint 210 may include a seal, such as a Duo-Cone™ seal (not shown), that contains lubrication required for a drive shaft, and/or one or more bearings that allow the hub portion 202 to rotate smoothly relative to the machine. Other seal arrangements are well known to those of skill in the art.

Each end 116 and 118 may have a clamp 212 connected to each axle 112 and 114 on an inboard side or machine-side of the axle-joint 210. The clamp 212 as shown is comprised of two halves that are connected to each other and form a "ring" around the axle. The clamp 212 supports a top guard 214, a bottom guard 216, and a guard plate 218. In this embodiment, the guard plate 218 is made of two semicircular members that are joined by the clamp 212 to form the guard plate 218. The guard plate 218 may have a generally circular outline with a central opening 401 used as a pass-through opening for the respective axle 112 or 114. The guard plate 218 may be placed on an inboard side of the axle-joint 210 and be perpendicular to each axle.

Figure 4:
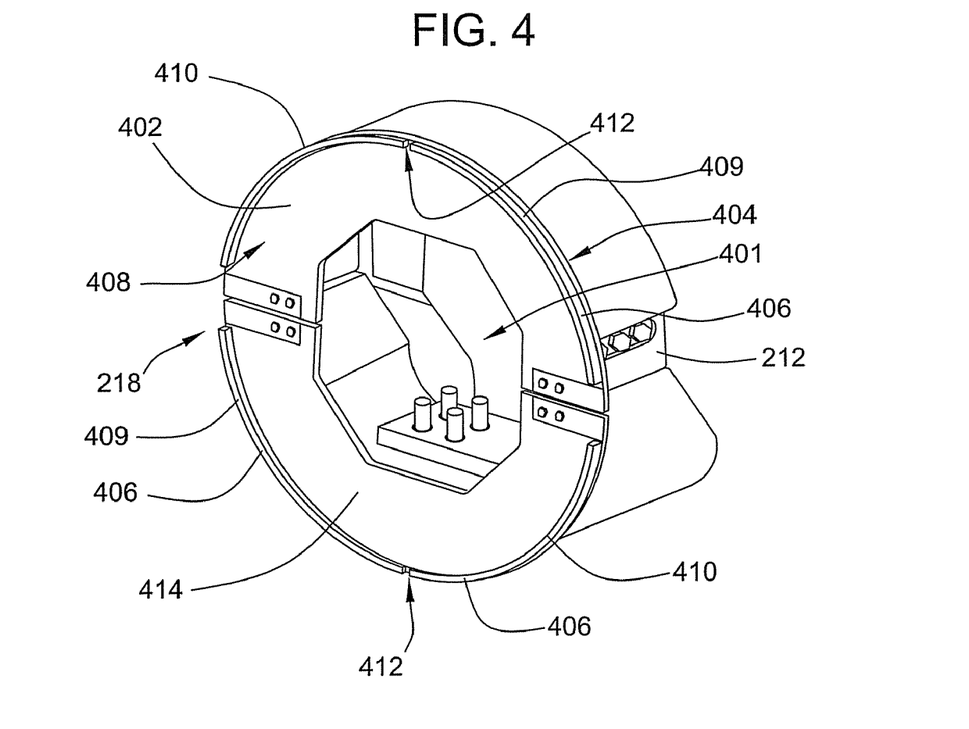
FIG. 4 is an outline view of a guard plate.

Shown in FIG. 4 is a perspective view of the clamp 212 having the guard plate 218 mounted thereon, the clamp 212 shown in an assembled state but with the axle removed for clarity. The guard plate 218 includes a central opening 401 that is surrounded in part by a first half 402 of the plate 218. The first half 402 may be located in what typically is a position on top of the axle. The first half 402 may have a generally semicircular outer edge 404. A circumferential flange 406 can be connected to the first half 402 on a wheel-side face 408 thereof, and along the outer edge 404. The circumferential flange 406 of this embodiment may be made of two curved or arcuate segments 409 and 410, which are connected to the first half 402 in generally the same manner and along the outer edge 404. A gap 412 can exist between the segments 408 and 410 to advantageously enable a tool, for example a welding tip, to effectively connect each adjoining end of each of the segments 409 and 410 securely to the first half 402. Optionally, the entire circumferential flange 406 may be made of a single piece having no gap 412 present, or alternatively, the circumferential flange 406 may be made of more than two pieces, yielding more than one gap to be present in the first half 402. In the case where multiple gaps are present, it is advantageous for the gaps to be as narrow as possible to avoid interruptions in the circumferential flange 406.

The guard plate 218 may include a second half 414 that can be located in what typically is a position beneath the axle. In this embodiment, the second half 414 may advantageously be identical to the first half 402, so further description is not provided for the sake of brevity. As can be appreciated, the guard plate 218 may be made of a single piece, or alternatively, may include two or more separate pieces that are individually connected to the clamp 212, or otherwise configured to complete the generally circular guard plate 218. When assembled, the guard plate 218 may advantageously extend around an entire portion of an axle and the circumferential flange 406 may extend around the entire guard plate 218 except, of course, for any gaps that may exist between flange segments.

Figure 5:
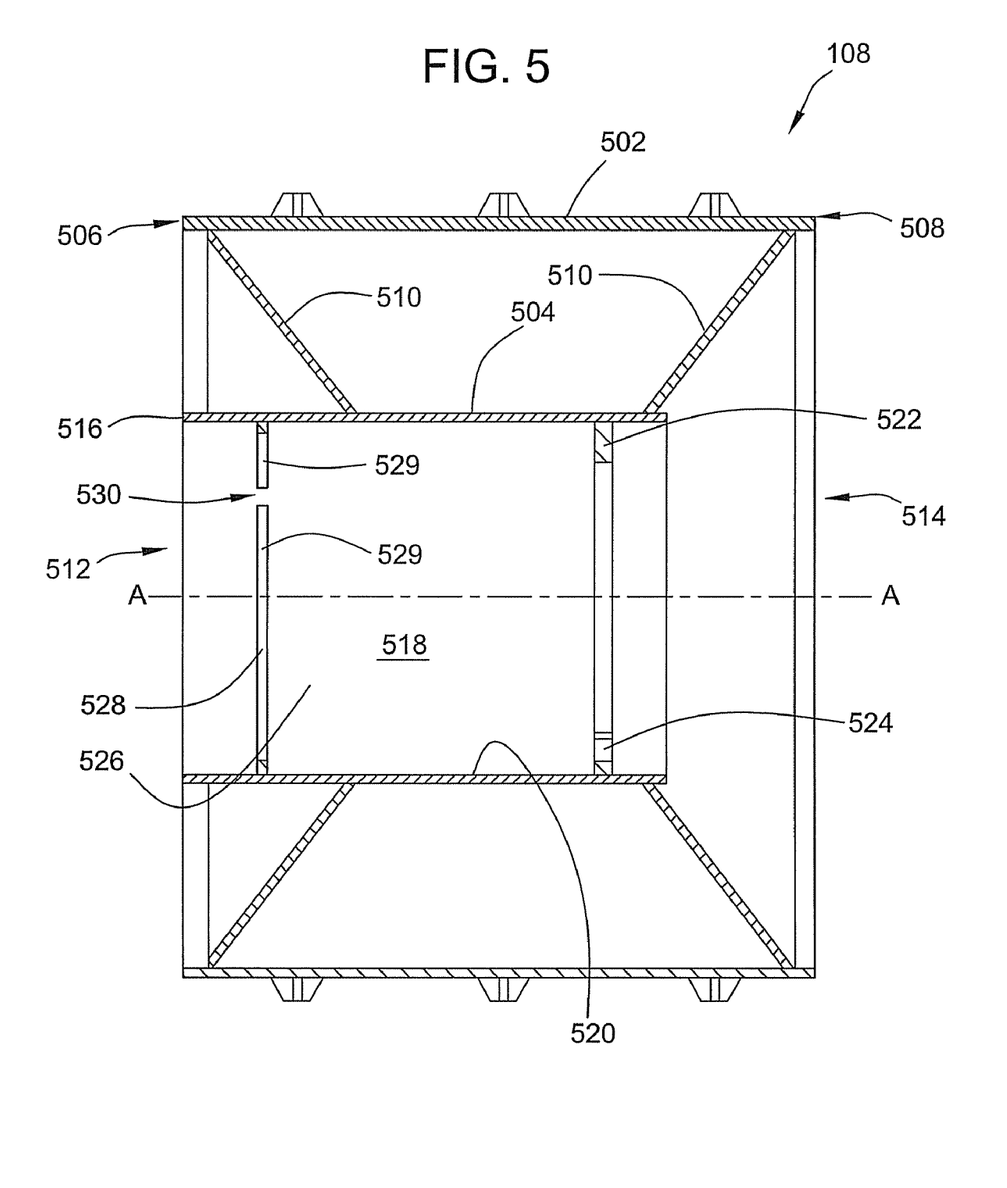
FIG. 5 is a cross-section of a wheel for a landfill compaction machine, the wheel having a circumferential flange within an internal cavity thereof, in accordance with the disclosure.
Figure 6:
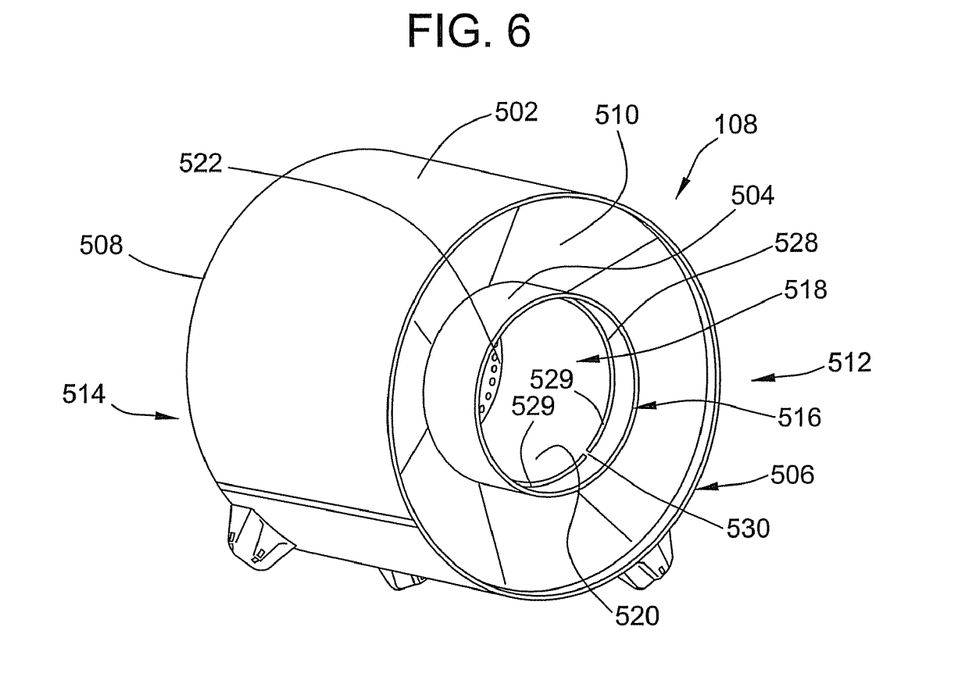
FIG. 6 is an outline view of one embodiment of a wheel for a landfill compaction machine.

A cross-section view of one of the wheels 108 is shown in FIG. 5, and an outline view is shown in FIG. 6. The wheel 108 includes an outer cylindrical portion 502 and an inner cylindrical portion 504. The inner cylindrical portion 504 is concentrically positioned within the outer cylindrical portion 502. The outer cylindrical portion 502 has an inboard edge surface 506, and an outboard edge surface 508 with respect to mounting orientation of the wheel 108 in relation to the machine 100, as shown in FIG. 1. Two frusto-conical rims 510, one located on an inboard side 512 of the wheel 108 and one located on the outboard side 514, connect the outer cylindrical portion 502 with the inner cylindrical portion 504.

The inner cylindrical portion 504 has an inboard edge surface 516 that can extend anywhere between the rim 510 located on the inboard side 512 of the wheel and up to a frame of the machine. In the embodiment tested, the inner cylindrical portion 504 extended up to the inboard edge surface 506 of the outer cylindrical portion 502. In the embodiment shown, the inboard edge surface 516 of the inner cylindrical portion 504 is coplanar with the inboard edge surface 506 of the outer cylindrical portion 502.

The inner cylindrical portion 504 defines a central cavity 518 of the wheel 108. An inner surface 520 of the inner cylindrical portion 504 laterally surrounds the central cavity 518. The inner surface 520 is generally cylindrical. A hub flange 522 extends peripherally along the inner surface 520 within the central cavity 518, and is perpendicular to a centerline A-A of the wheel 108. The hub flange 522 has a plurality of fastener openings 524 formed peripherally along the flange 522 that are configured to connect the wheel 108 to the hub portion 202 of an axle, as described above. The hub flange 522 defines an inboard portion 526 of the central cavity 518, the inboard portion 526 being on the side of the cavity 518 that is closer to the machine when the wheel 108 is mounted.

A first circumferential flange 528, or wheel-flange, may be located within the inboard portion 526 of the central cavity 518 of the wheel 108. The first circumferential flange 528 can be connected peripherally along the inner surface 520, and extend around the entire periphery of the inner surface 520. The first circumferential flange 528 may have a generally rectangular cross-section, and lie generally perpendicular to the centerline A-A. The first circumferential flange 528 may be made of a single elongate member having a circular profile that generally matches a profile of the inner surface 520, or may alternatively be made of two or more segments 529. In the embodiment shown, the first circumferential flange made of four segments 529 that are connected to the inner surface 520. Gaps 530 may be present between the segments 529 to permit entry of a tool, for example a welding tip, that is used to connect each of the segments 529 to the inner surface 520.

Figure 7:
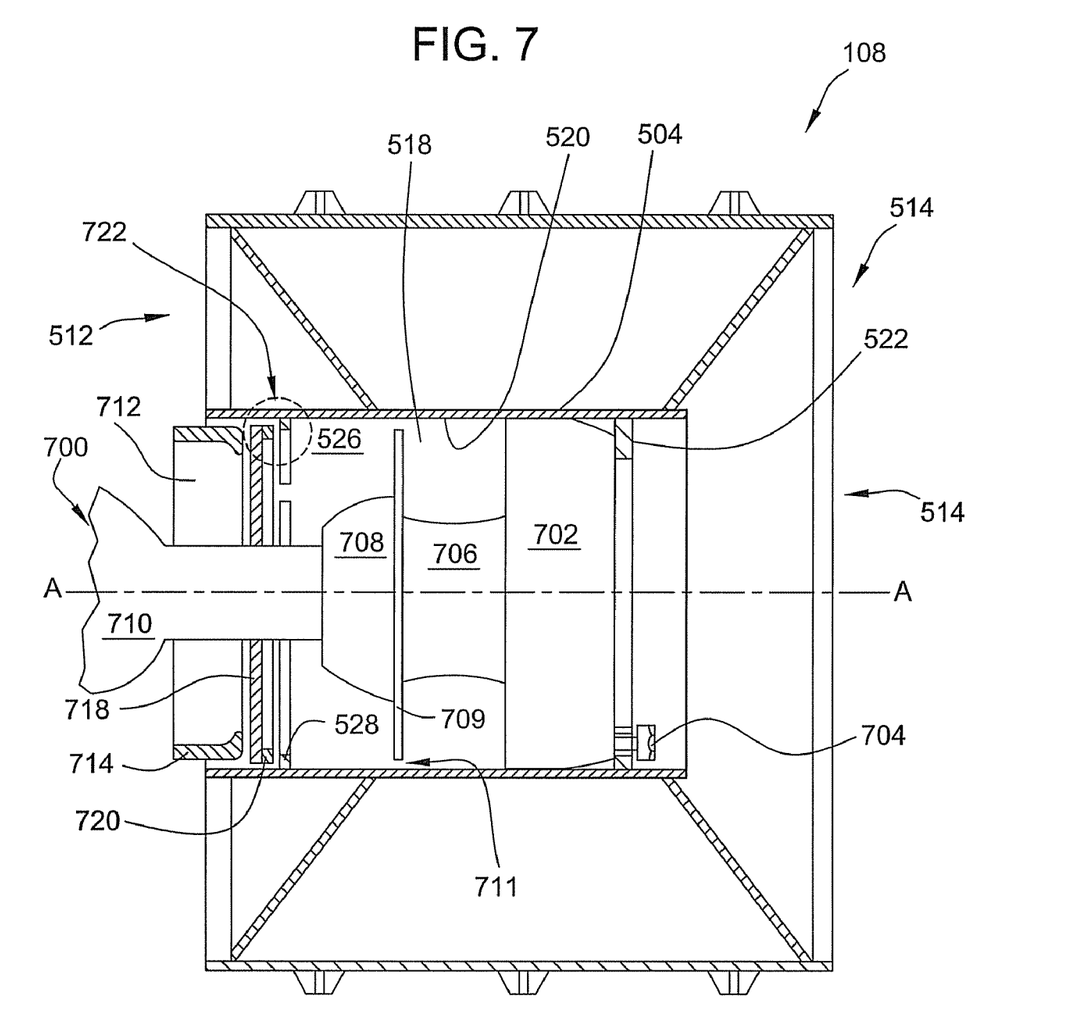
FIG. 7 is a partial cross-section of a labyrinth-guard arrangement for a wheel installed onto a machine axle in accordance with the disclosure.

A partial cross-section of the wheel 108 installed onto an axle 700 is shown in FIG. 7. The wheel 108 is shown in an installed position connected to the axle 700, with the axle 700 shown partially disposed within the central cavity 518. The axle 700 has a hub portion 702 that is connected to the hub flange 522 by a plurality of fasteners 704. The axle 700 has an extension portion 706 that connects the hub portion 702 with an axle joint 708. As previously described, the axle-joint 708 allows the hub portion 702 and extension portion 706 to rotate with respect to a remaining or non-rotating portion 710 of the axle 700. The non-rotating portion 710 extends in an inboard direction with respect to the axle-joint 708. The axle-joint 708 typically includes various components such as seals and bearings (not shown). In the embodiment shown, an additional guard-plate 709 extends peripherally around a portion of the axle-joint 708. The additional guard-plate 709 has a generally circular plate that extends toward the inner surface 520 of the inner portion 504. An additional gap 711 is radially defined around the additional guard-plate 709, the gap 711 extending entirely between the guard plate 709 and the inner portion 504.

The non-rotating portion 710 of the axle 700 supports a clamp (not shown), as described above, that can be used to mount a top guard 712 and a bottom guard 714. The top and bottom guards 712 and 714 may be partially disposed within the central cavity 518, but may alternatively be located outside of the cavity 518 adjacent to the inboard side 512 of the wheel 108. A guard plate 718 is connected to the non-rotating portion 710 of the axle 700. As described above, the guard plate 718 is generally flat and circular. The guard plate 718 is positioned generally perpendicularly to the centerline A-A and may be located within the central cavity 518. A second circumferential flange or guard-flange 720 is connected to the guard plate 718. The second circumferential flange 720 may be connected peripherally along an entire periphery of the guard plate 718. The second circumferential flange 720 is positioned on a side of the guard plate 718 that faces the outboard side 514 of the wheel 518. The cooperation of the first circumferential flange 528 with the second circumferential flange 720 and the guard plate 718 forms a labyrinth-guard 722 that is advantageously effective in preventing intrusion of wire wrap and other landfill material into the central cavity 518. In the embodiment shown, the gap 711 between the additional guard plate 709 and the inner portion 504 may augment the function of the labyrinth-guard 722 by introducing an additional obstacle to the intrusion of debris.

Figure 8:
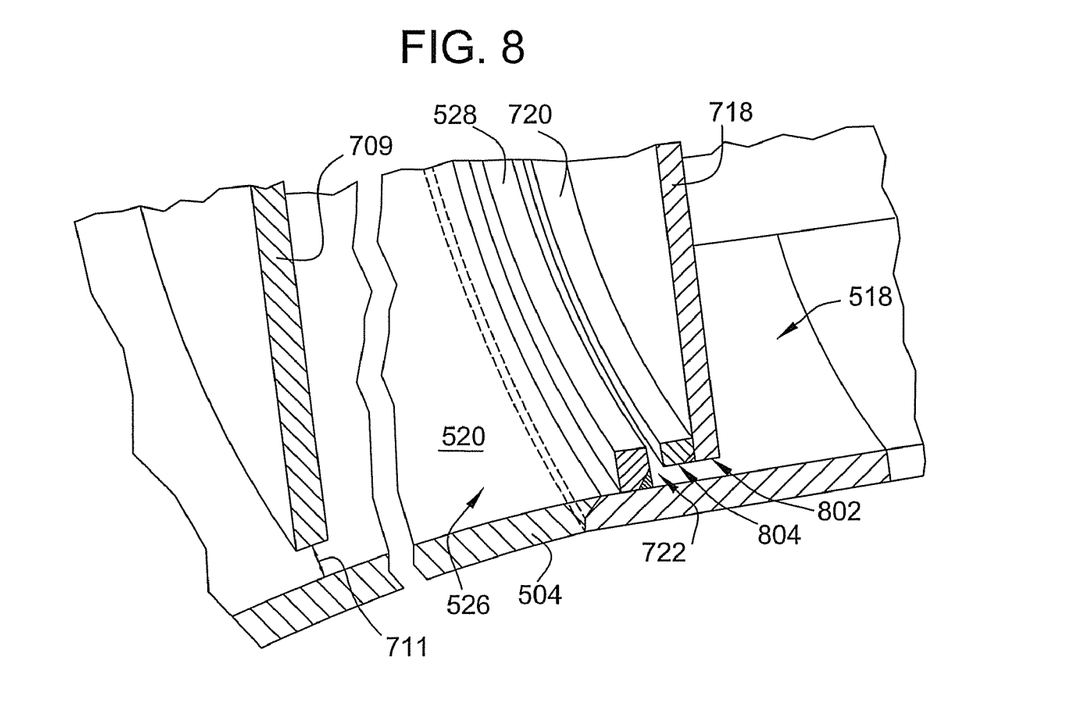
FIG. 8 is a cut-away view of one embodiment of a labyrinth-guard arrangement.
Figure 9:
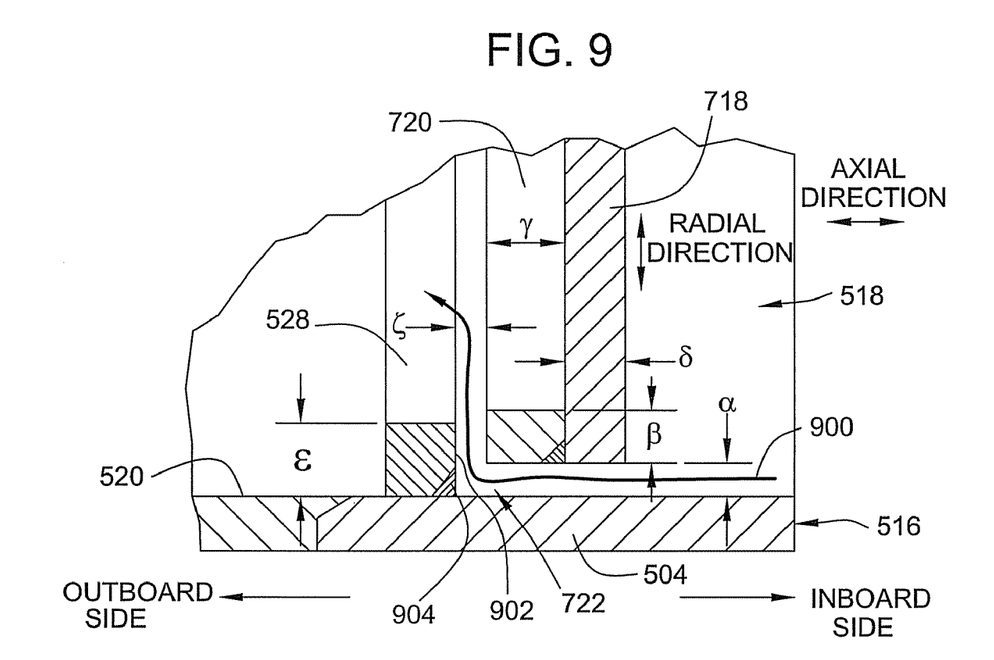
FIG. 9 is a cross-section of a labyrinth-guard arrangement in accordance with the disclosure.

A cut-away detail view of a region around the labyrinth-guard 722 is shown in FIG. 8, and a cross-section view is shown in FIG. 9. When the wheel 108 is installed on the axle 700, the first circumferential flange 528 is located adjacent to the second circumferential flange 720. The second circumferential flange 720 is positioned between the guard plate 718 and the first circumferential flange 528. The first circumferential flange 528, the second circumferential flange 720, and the guard plate 718 all at least partially reside within the central cavity 518. In the embodiment shown, an outer peripheral surface 802 of the guard plate 718 is at a clearance distance, a (alpha), along a radial direction with respect to the inner surface 520. An outer peripheral surface 804 of the second circumferential flange 720 is advantageously at the same radial distance α from the inner surface 520 but may alternatively be at a different distance from the inner surface 520. The second circumferential flange 720 has a thickness, β (beta), along a radial direction, and a length, γ (gamma), along an axial direction. The guard plate 718 has a thickness, δ (delta), along the axial direction. The first circumferential flange 528 extends a distance, ε (epsilon), in the radial direction from the inner surface 520. A clearance or gap, ζ (zeta), may be present along the axial direction between the first circumferential flange 528 and the second circumferential flange 720.

The labyrinth-guard 722 effectively inhibits intrusion of wire-wrap and/or other types of debris into the central cavity 526 of the wheel 108 by creating a tortuous path 900 that at least partially includes the gap ζ across the labyrinth-guard 722 between flanges 528 and 720. The path 900 is denoted by a solid-lined arrow and generally has an "L" shape, with one leg defined axially between the guard plate 718, the second circumferential flange 720, and the inner surface 520. A second leg of the path 900 is defined axially by the gap between the first circumferential flange 528 and the second circumferential flange 720. The first and second legs of the path 900 may intersect in a region adjacent to an interface between an inboard-side radially extending face 902 of the first circumferential flange 528, and the inner surface 520. It is advantageous to maintain a well-defined and clean corner, generally a 90 degree corner, along an entire periphery of the central cavity along this interface. For this reason, the first circumferential flange 528 may have a cutout or notch formed in the generally rectangular cross section thereof, that can be used to accommodate a weld bead 904 during assembly of the first circumferential flange 528 onto the inner surface 520. Accommodation of the weld bead 904 within the cutout or notch can allow for a cleaner interface and a more effective tortuous path to help exclude wire wrap from the central cavity.

Field testing has indicated that certain dimensional relationships or ratios present in the path 900 are more effective in preventing wire-wrap intrusion than others. For example, a ratio of about 3 between an axial length divided by a radial height of the first leg of the passage 900, and a ratio of about 1.5 between a radial length divided by an axial width of the second leg of the passage 900, have proven to be most effective. In the labyrinth-guard configuration tested, the radial distance α between the outer peripheral surface 802 of the guard plate and the inner surface 520 was about 11 mm. In that same configuration, the radial thickness β of the second circumferential flange 720 was about 5 mm, and the axial thickness γ of the second circumferential flange 720 was about 16 mm. The axial thickness δ of the guard plate 718 was about 12 mm, and the radial height ε of the first circumferential flange 528 was between 10 and 20 mm or about 16 mm as tested. Finally, the axial clearance or gap ζ between the first circumferential flange 528 and the second circumferential flange 720 was about 18.75 mm.

INDUSTRIAL APPLICABILITY

The industrial applicability of the labyrinth-guard arrangement between an axle and a wheel for a landfill compaction machine described herein will be readily appreciated from the foregoing discussion. Intrusion of wire wrap and/or other landfill material into a central cavity of a wheel is detrimental to the function, reliability, and serviceability of axle-joints. The axle guard assembly that includes a labyrinth-guard arrangement discussed herein is more effective than other known barrier configurations in preventing intrusion of debris into the central cavity of a wheel. The tortuous path defined by the various cooperating components present around an interface between the wheel and axle of the machine can effectively impede intrusion of debris into the wheel cavity. A combined effect of the clearance dimensions between the first circumferential flange, the second circumferential flange, the guard plate, and the inner surface of the central cavity of the wheel are sufficient to create a barrier against intrusion of debris and wire wrap in the axle joint. Moreover, the radially extending surface that perpendicularly meets the inner surface of the central cavity presents a sharp corner and a radially extending wall that blocks wire wrap from entering into the central cavity of the wheel.

The present disclosure is applicable to barrier arrangements for interfaces between wheels and axles of landfill compaction machines. The labyrinth-guard arrangement disclosed herein can advantageously be offered on new equipment, or can be used to retrofit existing equipment operating in the field.

A method of providing non-contact sealing against intrusion of landfill material at the axle-joint between a wheel and an axle of a landfill compactor machine includes the step of connecting a first circumferential flange peripherally along an inner portion of a central cylindrical cavity of the wheel. A second circumferential flange is provided peripherally along an outer edge of a wheel-facing side of a guard plate. The first and second circumferential flanges may be welded or otherwise connected to existing components on a machine operating in the field. After the first and second flanges have been connected and checked for clearances when the wheel is connected to the axle, the central cylindrical cavity may advantageously surround and protect the axle-joint, the guard plate may at least partially be recessed within the central cavity, the first circumferential flange may be located close to the second circumferential flange, and a tortuous path may be created between the inner portion of the central cylindrical cavity, the guard plate, the second circumferential flange, and the first circumferential flange. The tortuous path can advantageously act as a labyrinth-guard that inhibits intrusion of debris around the axle-joint.

It will be appreciated that the foregoing description provides examples of the disclosed system and technique. However, it is contemplated that other implementations of the disclosure may differ in detail from the foregoing examples. All references to the invention or examples thereof are intended to reference the particular example being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A labyrinth-guard for an axle arrangement assembly for a joint between a compactor wheel and a machine, comprising:
    a wheel-flange configured to connect to an inner portion of the compactor wheel, the inner portion surrounding a central cylindrical cavity of a compactor wheel, the wheel-flange having a substantially circular shape that conforms peripherally to the cavity, the wheel-flange having a first generally rectangular cross section;
    a guard-flange configured to connect to an outer portion of a circular guard plate that is connected to an axle of the machine adjacent to the joint, the guard-flange having a generally circular shape that conforms peripherally to the circular guard plate, the guard plate being at least partially disposed in the cavity, the guard-flange having a second generally rectangular cross section;
    the wheel-flange and the guard flange cooperating to form a labyrinth-guard when the wheel is connected to the machine and a gap exists between the wheel-flange and the guard flange.

2. The labyrinth-guard of claim 1, further comprising a cutout defined in the first cross section of the wheel-flange, the cutout configured to receive a weld-bead when the wheel-flange is connected to the wheel, wherein the weld-bead is adjacent to the gap along an interface between the wheel-flange and the inner portion.

3. The labyrinth-guard of claim 1, wherein an outer peripheral surface of the circular guard plate and an outer peripheral surface of the guard-flange are at a same radial distance from a center of the guard plate when the guard flange is connected to the guard plate.

4. The labyrinth-guard of claim 1, wherein the wheel flange extends into the central cavity by between 10 and 20 mm.

5. The labyrinth-guard of claim 1, wherein the gap is about 19 mm.

6. The labyrinth-guard of claim 1, wherein the wheel-flange is made up of two or more segments.

7. The labyrinth-guard of claim 1, wherein the guard-flange is made up of two or more segments.

8. The labyrinth-guard of claim 1, wherein the second generally rectangular cross section of the guard-flange measures about 5 mm in a radial direction and about 16 mm in an axial direction.

9. The labyrinth-guard of claim 1, wherein the first generally rectangular cross section of the wheel-flange measures about 16 mm in a radial direction.

10. A labyrinth-guard arrangement for impeding intrusion of landfill material into an axle-joint between a wheel and an axle of a landfill compactor machine, the labyrinth-guard arrangement comprising:
    a first circumferential flange disposed along an inner periphery of an inner cylindrical portion of the wheel, the wheel including:
        an outer cylindrical portion, and
        the inner cylindrical portion disposed concentrically within the outer cylindrical portion, the inner cylindrical portion defining a central cylindrical cavity, wherein the first circumferential flange extends toward a centerline of the central cavity;
    a guard plate connected adjacent to the axle-joint, the guard plate disposed perpendicular to the axle, the guard plate disposed at least partially within the central cylindrical cavity, the guard plate having an inboard-facing face and an outboard-facing face with respect to the machine, the guard plate including a second circumferential flange disposed peripherally around an edge of the outboard-facing face of the guard plate, the second circumferential flange extending perpendicularly away from the guard plate, the second circumferential flange disposed between the guard plate and the first circumferential flange when the wheel is connected to the axle;

wherein a labyrinth-guard is created between the first circumferential flange and the second circumferential flange, the labyrinth-guard adapted to inhibit intrusion of landfill material into the central cylindrical cavity when the wheel is connected to the axle.

11. The labyrinth-guard arrangement of claim 10, wherein the inner cylindrical portion extends no further than the outer cylindrical portion.

12. The labyrinth-guard arrangement of claim 10, wherein the first circumferential flange is disposed perpendicularly with respect to the central cavity.

13. The labyrinth-guard arrangement of claim 10, wherein an inboard edge surface of the outer cylindrical portion is coplanar with an inboard edge surface of the inner cylindrical portion.

14. The labyrinth-guard arrangement of claim 10, wherein an outer peripheral surface of the guard plate and an outer peripheral surface of the second circumferential flange are at a same radial distance from an inner periphery of the central cylindrical cavity.

15. The labyrinth-guard arrangement of claim 10, wherein the first circumferential flange includes more than one segment, wherein each of the more than one segment is separated by a gap from each adjacent segment.

16. The labyrinth-guard arrangement of claim 10, wherein the second circumferential flange includes more than one segment, wherein each of the more than one segment is separated by a gap from each adjacent segment.

17. The labyrinth-guard arrangement of claim 10, further including an additional guard plate connected to the axle, wherein the first circumferential flange is disposed between the guard plate and the additional guard plate.

* * * * *

UNITED STATES PATENT AND TRADEMARK OFFICE
CERTIFICATE OF CORRECTION

| | |
|---|---|
| PATENT NO. | : 7,556,323 B1 |
| APPLICATION NO. | : 11/779397 |
| DATED | : July 7, 2009 |
| INVENTOR(S) | : Gachhadar et al. |

It is certified that error appears in the above-identified patent and that said Letters Patent is hereby corrected as shown below:

Column 5, line 63, after "distance," delete "a" and insert -- $\alpha$ --.

Signed and Sealed this

Seventeenth Day of November, 2009

David J. Kappos
*Director of the United States Patent and Trademark Office*